(12) United States Patent
Han et al.

(10) Patent No.: US 9,465,636 B2
(45) Date of Patent: Oct. 11, 2016

(54) CONTROLLING VIRTUAL MACHINE IN CLOUD COMPUTING SYSTEM

(75) Inventors: Seok-Woong Han, Gyeonggi-do (KR); Jong-Min Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 180 days.

(21) Appl. No.: 13/592,445

(22) Filed: Aug. 23, 2012

(65) Prior Publication Data

US 2013/0055261 A1 Feb. 28, 2013

(30) Foreign Application Priority Data

Aug. 24, 2011 (KR) .................. 10-2011-0084837

(51) Int. Cl.
*G06F 9/45* (2006.01)
*G06F 9/455* (2006.01)

(52) U.S. Cl.
CPC . *G06F 9/45558* (2013.01); *G06F 2009/45583* (2013.01)

(58) Field of Classification Search
CPC .................................. G06F 9/45533
USPC ........................................... 718/1
See application file for complete search history.

(56) References Cited

U.S. PATENT DOCUMENTS

| | | |
|---|---|---|
| 7,904,914 B2 | 3/2011 | Green et al. |
| 8,225,334 B2 | 7/2012 | Green et al. |
| 2009/0228589 A1 | 9/2009 | Korupolu |
| 2009/0276771 A1* | 11/2009 | Nickolov et al. ............ 717/177 |
| 2010/0023703 A1 | 1/2010 | Christie et al. |
| 2010/0023704 A1 | 1/2010 | Christie et al. |
| 2010/0023706 A1 | 1/2010 | Christie et al. |
| 2010/0023707 A1 | 1/2010 | Hohmuth et al. |
| 2010/0079472 A1 | 4/2010 | Shang et al. |
| 2010/0205408 A1 | 8/2010 | Chung et al. |
| 2011/0246984 A1* | 10/2011 | Sharp et al. ..................... 718/1 |
| 2011/0314470 A1* | 12/2011 | Elyashev et al. ................ 718/1 |
| 2012/0054306 A1* | 3/2012 | Vaghani et al. ............ 709/217 |
| 2012/0054746 A1* | 3/2012 | Vaghani ............... G06F 9/5022 718/1 |
| 2012/0284527 A1* | 11/2012 | Nagpal et al. ................ 713/189 |
| 2012/0291115 A1* | 11/2012 | Monk et al. .................... 726/11 |

(Continued)

FOREIGN PATENT DOCUMENTS

| | | |
|---|---|---|
| KR | 10-2010-0037012 A | 4/2010 |
| KR | 10-2011-0044884 A | 5/2011 |

(Continued)

OTHER PUBLICATIONS

Circuit, https://en.wiktionary.org/wiki/circuit, retrieved on Jan. 5, 2015.*

(Continued)

*Primary Examiner* — Emerson Puente
*Assistant Examiner* — Charlie Sun
(74) *Attorney, Agent, or Firm* — IP Legal Services, LLC

(57) ABSTRACT

Described embodiments provide for controlling a plurality of virtual machines in a cloud computing system. At least one virtual storage allocated to the plurality of virtual machines may be monitored. Based on the monitoring result, a virtual storage in a service unable state may be detected among the monitored at least one virtual storage. A virtual machine associated with the detected virtual storage may be temporarily interrupted.

16 Claims, 2 Drawing Sheets

(56) References Cited

U.S. PATENT DOCUMENTS

2012/0297379 A1* 11/2012 Anderson et al. ............. 718/1
2013/0055240 A1* 2/2013 Gondi ............................ 718/1

FOREIGN PATENT DOCUMENTS

KR   10-2011-0051028 A   5/2011
WO   2010/039427 A2   4/2010

OTHER PUBLICATIONS

API, https://en.wiktionary.org/wiki/application_programming_interface, retrieved on Jan. 5, 2015.*

* cited by examiner

CONTROLLING VIRTUAL MACHINE IN CLOUD COMPUTING SYSTEM

CROSS REFERENCE TO PRIOR APPLICATIONS

The present application claims priority under 35 U.S.C. §119 to Korean Patent Application No. 10-2011-0084837 (filed on Aug. 24, 2011), which is hereby incorporated by reference in its entirety.

FIELD OF THE INVENTION

The present invention relates to cloud computing system and, in particular, to controlling virtual machines to access corresponding virtual storages.

BACKGROUND OF THE INVENTION

A typical computing environment uses computing resources belonging to individual computing hardware in order to provide services to clients. With the development of computer network technology, such a typical computing environment has evolved into a cloud computing environment. Cloud computing may provide relevant services using available computing resources distributed over a network without end-user knowledge of physical location and configuration of respective computing resources that deliver the services.

A cloud computing system may provide an on-demand outsourced service of computing resources through an information telecommunication network such as the Internet. In a cloud computing system, a service provider may virtually consolidate data centers distributed over a network to provide necessary services to end-users. In the cloud computing service, a user may not be required to buy or install computing resources including applications, storage, operating systems (OS), and/or security software, in a user equipment. Instead, a user may select and simply use virtualized computing resources whenever a user desires.

Such a cloud computing system requires rapid elasticity for commonly sharing computing resources with a plurality of users and for dynamically acquiring and releasing computing resources in response to an on-demand self service. In order to realize such a cloud computing system, virtualization has been employed. Virtualization may be a technology for creating a virtual version of computing environments such as a computing processor, an operating system, a server, a storage device, and/or network resources. That is, virtualization may enable a plurality of users to share one physical system by creating multiple independent virtual machines using computing resources of the one physical system. Through virtualization, limited computing resources can be efficiently operated and managed for a large scale data center and the utilization thereof can be maximized.

The cloud computing system may i) create a plurality of independent virtual machines using single physical computing hardware and ii) independently run an operating system and applications through each virtual machine. The virtual machine may be a virtual computing environment created with allocated hardware resources. For example, such a virtual machine may be created and managed by a hypervisor. The hypervisor may be a software program installed in a physical server. The hypervisor may control and manage running operating systems and applications through a plurality of virtual machines. The hypervisor may be referred to as a virtual machine monitor (VMM). The hypervisor may allow multiple operating systems to run concurrently on a host computer. Such multiple operation systems may be referred as guest operating systems.

Hardware resource virtualization may be classified into full-virtualization and para-virtualization. The full-virtualization may be almost complete simulation of an actual hardware to allow software to run unmodified. In the full-virtualization, a hypervisor may support a virtual machine to directly control corresponding hardware without modification of a guest operating system. The guest operating system may denote an operating system running on a virtual machine. Unlike the full-virtualization, the para-virtualization may not simulate a hardware environment. In the para-virtualization, a virtual machine cannot directly control corresponding hardware through a guest operating system. The virtual machine may request a hypervisor to control the corresponding hardware and the hypervisor may control the corresponding hardware through an optimized method. In order to indirectly control the hardware through the hypervisor, a part of a kernel of a guest operating system may be required to be modified.

In such a para-virtualization based cloud computing system, a virtual machine may perform file input/output operations through a hypervisor. During performing the file input/output operations, errors may be generated in a hypervisor level and/or a storage level. For example, errors may be generated in a network connecting the hypervisor and an associated virtual storage. Furthermore, a storage device may be temporarily unavailable to provide a related service. In this case, a file system of a guest operating system in a virtual machine may be seriously damaged or permanently corrupted.

SUMMARY OF THE INVENTION

This summary is provided to introduce a selection of concepts in a simplified form that is further described below in the Detailed Description. This summary is not intended to identify key features or essential features of the claimed subject matter, nor is not intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a virtual machine may be temporarily interrupted when an associated virtual storage is in a service unable state due to errors generated in a hypervisor level and/or a storage level.

In accordance with another aspect of the present invention, a file system of a virtual machine may be protected from serious damages in a related file system by temporarily pausing virtual computing resources of the virtual machine without releasing the virtual computing resources of the virtual machine.

In accordance with still another aspect of the present invention, a consistency in a file system of a virtual machine may be maintained through temporarily interrupting processes performed in the virtual machine when errors are generated in a hypervisor level and/or a storage level.

In accordance with yet another aspect of the present invention, a virtual storage in a service unable state may be continuously monitored and a paused virtual machine may be resumed after the service unable state of the monitored virtual storage is changed to a service ready state.

In accordance with embodiments of the present invention, a method may be provided for controlling a plurality of virtual machines in a cloud computing system. The method may include monitoring at least one virtual storage allocated to the plurality of virtual machines, detecting a virtual storage in a service unable state among the monitored at least one virtual storage, and temporarily interrupting a virtual machine associated with the detected virtual storage.

The monitoring may include detecting errors generated at one of a hypervisor level connection and a storage level connection based on a result of the monitoring, and determining a virtual storage associated to the detected errors as the virtual storage in the service unable state.

The interrupting a virtual machine may includes determining a virtual machine associated with the detected virtual storage and pausing virtual computing resources allocated to the determined virtual machine without returning the virtual computing resources.

The interrupting a virtual machine may include determining a virtual machine associated with the detected virtual storage and pausing processes performed in the determined virtual machine without returning the virtual computing resources. The processes may be related to accessing the at least one virtual storage.

The method may further include monitoring the detected virtual storage in the service unable state, determining whether the service unable state of the monitored virtual storage is changed to a service ready state based on the monitoring result, and resuming the interrupted virtual machine associated with the monitored virtual storage when the service unable state is changed to the service ready state.

The method may further include continuously allowing virtual machines not associated with the at least one virtual storage in the service unable state.

The cloud computing system may be virtualized based on a para virtualization.

The cloud computing system may include a storage, a hypervisor, and a storage interface. The storage may be configured to provide a plurality of virtual storages to the plurality of virtual machines. The hypervisor may be configured to allocate the plurality of virtual storage of the storage to the plurality of virtual machines and to control the allocated virtual storages in response to request of the plurality of virtual machines. The storage interface may be configured to provide an interface to the hypervisor to access the plurality of virtual storages allocated to the plurality of virtual machines. The detecting may include detecting errors generated in a network connecting the hypervisor and the storage, a network between the storage interface and the storage, and a network between the storage interface and the hypervisor.

In accordance with another embodiment of the present invention, an apparatus may be provided for controlling a plurality of virtual machines in a cloud computing system. The cloud computing system may include a storage providing a plurality of virtual storages to the plurality of virtual machine, a hypervisor controlling the storage and the plurality of virtual machine, and a storage interface providing an interface to the hypervisor and the apparatus to access the plurality of virtual storages of the storage. The apparatus may include a monitor unit and a control unit. The monitor unit may be configured to monitor at least one virtual storage allocated to the plurality of virtual machines. The control unit may be configured to detect a virtual storage in a service unable state among the monitored at least one virtual storage and to temporarily interrupt a virtual machine associated with the detected virtual storage.

The monitor unit may be configured to detect errors generated at one of a hypervisor level connection and a storage level connection based on the monitoring result and to determine a virtual storage associated to the detected errors as the virtual storage in the service unable state.

The control unit may be configured to determine a virtual machine associated with the detected virtual storage and to pause virtual computing resources allocated to the determined virtual machine without returning the virtual computing resources.

The control unit may be configured to determine a virtual machine associated with the detected virtual storage and to pause processes performed in the determined virtual machine without returning the virtual computing resources. The processes may be related to accessing the at least one virtual storage.

The monitor unit may be configured to monitor the detected virtual storage in the service unable state. The control unit may be configured to determine whether the service unable state of the monitored virtual storage is changed to a service ready state based on the monitoring result and to resume the interrupted virtual machine associated with the monitored virtual storage when the service unable state is changed to the service ready state.

The control unit may be configured to continuously allow virtual machines not associated with the at least one virtual storage in the service unable state.

The monitor unit may be configured to detect errors generated in a network connecting the hypervisor and the storage, a network between the storage interface and the storage, and a network between the storage interface and the hypervisor.

The apparatus may be embodied as a module in the hypervisor. The monitor unit and the control unit may be embodied using application programming interfaces (API) of the hypervisor.

In accordance with still another embodiment of the present invention, provided is a non-transitory machine-readable storage medium, having encoded thereon program code, wherein, where the program code is executed by a machine, the machine implements a method of controlling a plurality of virtual machines in a cloud computing system. The non-transitory machine-readable storage medium may include the steps of monitoring at least one virtual storage allocated to the plurality of virtual machines, detecting a virtual storage in a service unable state among the monitored at least one virtual storage, and temporarily interrupting a virtual machine associated with the detected virtual storage.

In accordance with yet another embodiment of the present invention, an apparatus may be provided for controlling virtual machines in a cloud computing system. The apparatus may include a monitor unit and a control unit. The monitor unit may be configured to monitor a plurality of virtual storages through a storage interface. The storage interface may be configured to be allocated to the virtual machines and provide an interface to the virtual machines to access corresponding virtual storages. The control unit may be configured to detect virtual storages in a service unable state among the plurality of virtual storages based on the monitoring result. The control unit may be configured to interrupt processes performed by virtual machines associated with the detected virtual storages without returning computing resources of the associated virtual machines.

The monitor unit may be configured to monitor the detected virtual storages in the service unable state. The control unit may be configured to determine whether a state of each of the detected virtual storages is changed to a service ready state based on the monitoring result. When the state is changed from the service unable state to the service ready state, the control unit may be configured to resume the interrupted processes of a virtual machine associated with the virtual storage changing the service unable state to the service ready state.

The monitor unit and the control unit may be embodied as a module on a hypervisor that allocates the plurality of virtual storages to the virtual machines and control the plurality of virtual storages through the storage interface in response to requests from the virtual machines.

In accordance with yet another embodiment of the present invention, a method for managing a plurality of virtual machines in a cloud computing system that provides a virtualized computing environment to a client through the plurality of virtual machines. The method may include monitoring the plurality of virtual storages respectively allocated to the plurality of virtual machines through a storage subsystem that provides an interface to the plurality of virtual machines to access the allocated virtual storages, determining whether the monitored virtual storages are in a service unable state or not, detecting a virtual storage in the service unable state from the monitored virtual storage based on the determination result, and interrupting processes of a virtual machine associated with the detected virtual storage without returning computing resources of the virtual machine associated with the detected virtual storage.

The method may further include monitoring the detected virtual storage in the service unable state, determining whether the service unable state of the detected virtual storage is changed to a service ready state based on the monitoring result, and resuming the interrupted processes of the virtual machine when the service unable state of the detected virtual storage is changed to the service ready state.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
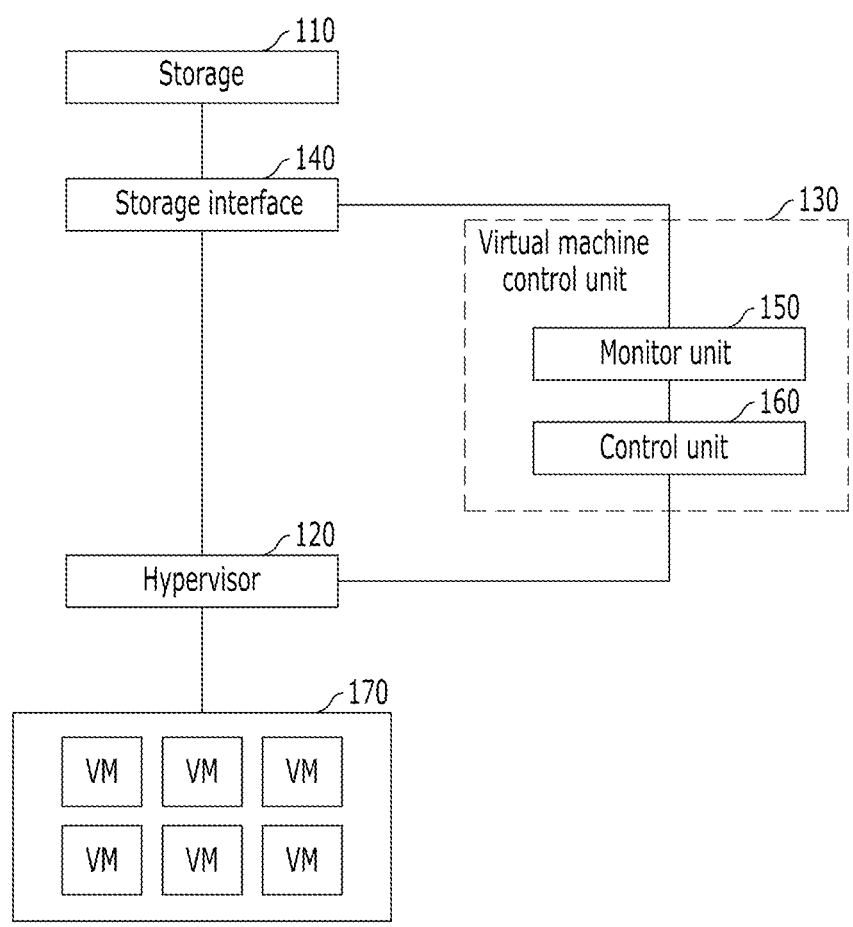
FIG. 1 shows a cloud computing system in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In order to protect a file system of a virtual machine in a para virtualization based cloud computing system, a virtual storage allocated to the virtual machine may be monitored whether the allocated virtual storage is in a service unable state in accordance with embodiments of the present invention. When the allocated virtual storage is in the service unable state, the virtual machine may temporarily be interrupted without returning virtual computing resources of the virtual machines in accordance with embodiments of the present invention. The virtual storage in the service unable state may be continuously monitored. When the service unable state is changed to a service ready state, the interrupted virtual machine may resume in accordance with embodiments of the present invention. Such operations may be performed through a virtual machine control apparatus in accordance with embodiments of the present invention. Hereinafter, the virtual machine control apparatus will be described with reference to FIG. 1.

FIG. 1 shows a cloud computing system in accordance with embodiments of the present invention.

Referring to FIG. 1, cloud computing system 100 may include storage 110, hypervisor 120, virtual machine control unit 130, storage interface 140, and plurality of virtual machines 170. Cloud computing system 100 may be implemented through para virtualization, but the present invention is not limited thereto.

Storage 110 may provide virtual storages to plurality of virtual machines 170 in response to the control of hypervisor 120. The virtual storages may be one of virtual computing resources provided in cloud computing system 100. Storage 110 may be a disk array including a plurality of disks. The present invention, however, is not limited thereto. Storage 110 may be a storage server and/or a storage pool, which may include multiple storage devices coupled through a communication network or an interbus connection.

Hypervisor 120 may be a virtual platform for running a plurality of virtual machines 170 in single physical computing equipment. Hypervisor 120 may be referred to as a virtual machine monitor (VMM). In accordance with embodiments of the present invention, hypervisor 120 may allocate virtual storages of storage 110 to one or more of plurality of virtual machines 170 and control the allocated virtual storages in response to requests of virtual machines 170.

Storage interface 140 may be an interface between storage 110 and hypervisor 120 or between storage 110 and virtual machine control unit 130. Particularly, storage interface 140 may provide an interface to hypervisor 120 and virtual machine control unit 130 in order to access virtual storages allocated to one or more of plurality of virtual machines 170. Storage interface 140 may be referred to as a storage subsystem or a disk subsystem. For example, a network file system (NFS) and/or internet small computer system interface (ISCSI) may be used as a protocol between storage interface 140 and hypervisor 120 or between storage interface 140 and virtual machine control unit 130.

Virtual machine control unit 130 may be coupled between storage interface 140 and hypervisor 120. Virtual machine control unit 130 may control a plurality of virtual machines 170 to access corresponding virtual storages allocated thereto in accordance with embodiments of the present invention. Virtual machine control unit 130 may protect a file system of each virtual machine from errors generated in a hypervisor level and a storage level. For example, virtual machine control unit 130 may allow virtual machines 170 to access corresponding virtual storages allocated thereto when the corresponding virtual storages are in a service ready state. That is, errors are not detected in a hypervisor level and/or a storage level, virtual machine control unit 130 may enable virtual machines 170 to perform file input/output operation to storage 110 through hypervisor 120. On the contrary, virtual machine control unit 130 may temporarily interrupt or pause virtual machines 170 without returning or releasing virtual computing resources allocated to the virtual machine 170 when the corresponding virtual storages of storage 100 are in a service unable state due to errors in a hypervisor level and/or storage level. In accordance with embodiments of the present invention, virtual machine control unit 130 may include monitor unit 150 and control unit 160.

Monitor unit 150 may monitor virtual storages allocated to each virtual machine 170 and determine, through storage interface 140, whether the allocated virtual storage is in a service unable state or not. Furthermore, monitor unit 150 may continuously monitor the virtual storages in the service unable state and transfer the monitoring result to control unit 160. For example, monitor unit 150 may monitor a connection state in a hypervisor level and/or a connection state in a storage level in accordance with embodiments of the present invention.

Control unit 160 may be provided with the monitoring result from monitor unit 150. Based on the monitoring result, control unit 160 may detect a virtual storage in a service unable state among the virtual storages allocated to virtual machines 170. For example, control unit 160 may determine whether errors are generated in a connection state in a hypervisor level and/or a connection state in a storage level based on the monitoring results of monitor unit 150. When control unit 160 determines that errors are generated, control unit 160 may detect a virtual storage associated with the error and determine that the detected virtual storage is in the service unable state. Control unit 160 may determine a virtual machine associated with the detected virtual storage and temporarily interrupt the determined virtual machine without returning virtual computing resources of associated virtual machine 170 in accordance with embodiments of the present invention. Furthermore, control unit 160 may resume the interrupted virtual machine 170 when the detected virtual storage is changed from the service unable state to a service ready state based on the monitoring result provided from monitor unit 150 in accordance with embodiments of the present invention.

A virtual storage may be temporarily unavailable to provide a file input/output service to virtual machines 170 when a virtual storage is in the service unable state. Such service unable state of a virtual storage may be caused by errors that might be generated while storage 110 provides a related service to virtual machines 170. Such errors may be generated in various elements related to storage 110 in cloud computing system 100. For example, such error may be generated in storage 110, in hypervisor 120, in a network connecting hypervisor 120 and storage 110, in a network between storage interface 140 and storage 110, or a network between storage interface 140 and hypervisor 120. That is, various types of errors may be generated in a hypervisor level and/or a storage level.

If virtual machines 170 continuously request a file input/output service to a virtual storage in the service unable state through hypervisor 120, hypervisor 120 may instruct storage 110 to provide the requested service to virtual machine 170. In this case, virtual machines 170 may be not properly provided with the requested file input/output services from storage 110. Such requests and instructions may cause damage in a file system of the virtual storage of storage 110. Due to such damage, consistency of the file system of the virtual storage may be not maintained, thereby seriously corrupting entire file system.

For example, when a virtual machine has a Linux ext3 partition file system and when the virtual machine requests a random read/write service to the allocated virtual storage in the service unable state, the Linux ext3 partition file system of the allocated virtual machine may switch to a read only mode or a root file system of the Linux ext3 partition file system may be seriously damaged. Particularly, when the root file system is damaged, such a virtual machine may become malfunctioned.

After the detection of each virtual storage in the service unable state, controller 160 may temporarily interrupt a corresponding virtual machine without returning virtual computing resources belonging to the corresponding virtual machine. For example, virtual computing resources of the corresponding virtual machine may be a memory, a central processor unit (CPU), and network resources. Controller 160 may temporarily pause the virtual computing resources allocated to the corresponding virtual machine. That is, related processes performed in the corresponding virtual machine may be paused until the detected virtual storages are changed from the service unable state to a service ready state.

After the interruption, controller 160 may request monitor unit 150 to continuously monitor the virtual storage in the service unable state at a regular interval. Such interval may be shorter than about 10 seconds. The present invention, however, is not limited thereto. When monitor unit 150 determines that the virtual storage is changed from the service unable state to the service ready state, controller 160 may resume the interrupted virtual machine. That is, the temporarily interrupted virtual computing resources of the virtual machine may be resumed, thereby continuously performing the paused processes of the virtual machine.

According to a related simulation test, an average duration of temporarily interrupting the virtual machine may be shorter than about 5 seconds. Although a corresponding service is not provided during about 5 seconds, a critical damage in a file system may be prevented in accordance with embodiments of the present invention.

In accordance with embodiments of the present invention, virtual machine control unit 130 may be a constituent element of cloud computing system 100. Virtual machine control unit 130 may be embodied as a hardware device including a programmable logical circuit and other electronic circuits. The programmable logical circuit may include at least one of a digital signal processor (DSP) controller, an application specific integrated circuit (ASIC), and a field programmable gate array (FPGA). Furthermore, at least one of constituent elements of virtual machine control unit 130 may be embodied as a software program. Such a software program may be recorded in a computer readable medium. In addition, functions and features of virtual machine control unit 130 may be embodied as a combination of software programs and hardware devices.

Although virtual machine control unit 130 is illustrated as an independent virtual machine in cloud computing system 100 as shown in FIG. 1, the present invention is not limited thereto. Virtual machine control unit 130 may be realized in other constituent elements in cloud computing system 100. For example virtual machine control unit 130 may be implemented in hypervisor 120. Accordingly, monitor unit 150 and controller 160 may be embodied as a module in hypervisor 120 in accordance with embodiments of the present invention. In this case, such modules may be coupled to storage interface 140 through a network and/or a local system bus.

Particularly, monitor unit 150 and controller 160 may be operated as a daemon process performed through a script, for example, an application programming interface (API) that is provided from hypervisor 120. When Xen is implemented as hypervisor 120, functions and features of virtual machine control unit 130 may be realized through Xen application program interfaces (APIs). Xen may be free software developed by the University of Cambridge Computer Laboratory. Xen may provide various types of APIs that control and manage virtual computing resources in cloud computing system 100, particularly a hypervisor. The API may be from a set of remote procedure call (RPC). For example, features and functions of monitor unit 150 may be realized using at least one of a RPC "probe" and a RPC "scan." The RPC "probe" may be a RPC associated with class storage repository (SR). The RPC "probe" may perform a backend-specific scan using a given device_config. If the device_config is complete, then the RPC "probe" may return a list of the SRs presents of this type on the device, if any. If the device_config is partial, then a backend-specific scan will be performed and return a result. The RPC "scan" may scan interfaces on a host and create PIF objects to represent the interfaces. The PIF objects may denote physical network interface objects. Particularly, the RPC "scan" may be used to determine whether errors are generated in a hypervisor level. Furthermore, a storage appliance API (SA-API) may be used to implement the features and functions of monitor unit 150. For example, a SA-API "get_connection" may be used to determine whether errors are generated in a storage level. The SA-API "get_connection" may get all connections for a given ISCSI session between an initiator and a specific target.

Features and functions of control unit 160 may be realized using a RPC "pause" and/or a RPC "unpause." The RPC "pause" may pause a specific virtual machine. The RPC "unpause" may resume a specific virtual machine. The PRC "unpause" may be called when the specific virtual machine is paused.

The described RPC and SA-API may be only examples of implementing features and functions of virtual machine control unit 130. The present invention, however, is not limited thereto. Scripts in various formats may be used to implement the functions and features of virtual machine control unit 130.

As described, virtual machine control unit 130 may detect a virtual storage in a service unable state and interrupt a virtual machine associated with the detected virtual storage in accordance with embodiments of the present invention. Such operations of virtual machine control unit 130 will be described with reference to FIG. 2.

Figure 2:
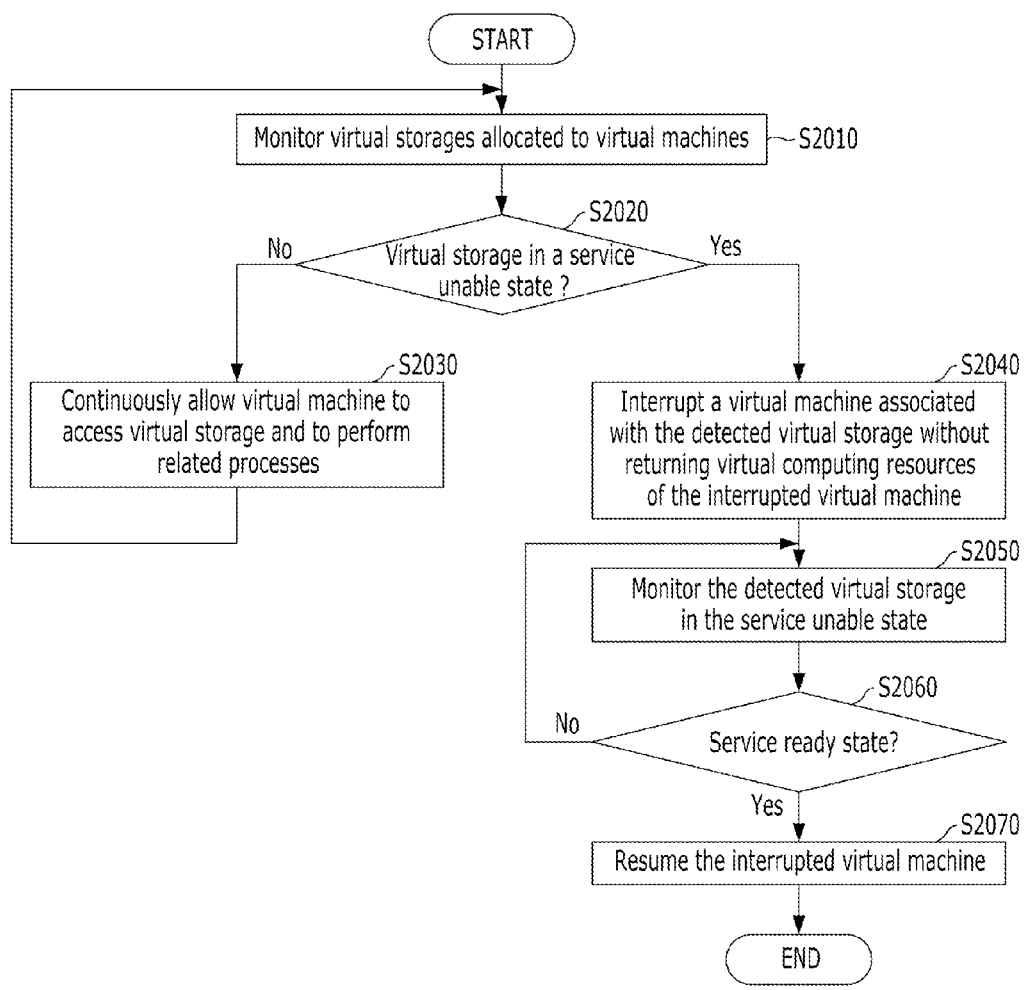
FIG. 2 shows a method for controlling and managing virtual machines to access virtual storages allocated to the virtual machines in accordance with embodiments of the present invention.

FIG. 2 shows a method for controlling and managing virtual machines to access virtual storages allocated to the virtual machines in accordance with embodiments of the present invention.

Referring to FIG. 2, virtual storages allocated to virtual machines may be monitored at step S2010. For example, hypervisor 102 may allocate at least one virtual storage included in storage 110 to virtual machine 170. After the allocation, hypervisor 102 may manage the allocated virtual storages in response to request from the corresponding virtual machine. The allocated virtual storage may provide a related service to corresponding virtual machine 170 through hypervisor 120. While providing such service, virtual machine control unit 130 may monitor the allocated virtual storage for detecting a virtual storage in a service unable state. Such operation may be performed through monitor unit 150 and control unit 160. For example, monitor unit 150 may check connection states and operation states, related to storage 110. Particularly, a connection state in a hypervisor level and/or a connection state in a storage level will be monitored to determine whether errors are generated in the hypervisor level and/or the storage level in accordance with embodiments of the present invention.

At step S2020, a virtual storage in a service unable state may be detected based on the monitoring result. For example, control unit 160 of virtual machine control unit 140 may receive the monitoring result from monitor unit 150 and determine errors are generated in a connection state in a storage level and a connection state in a hypervisor level. When errors are generated, control unit 160 may detect a virtual storage associated with the generated errors and determine the detected virtual storage in a service unable state based on the monitoring result.

When no virtual storage in a service unable state is detected (No-S2020), the virtual machines may be continuously allowed to access virtual storages and to perform related processes at step S2030 and the allocated virtual storages may be continuously monitored at step S2010. For example, when control unit 160 detects no virtual storage in the service unable state, control unit 160 may request hypervisor 120 to continuously allow virtual machines 170 to access virtual storages of storage 110 and to perform file input/output services and request monitor unit 150 to continuously monitor the allocated virtual storages.

When a virtual storage in a service unable state is detected among the allocated virtual storage (Yes-S2020), a virtual machine associated with the detected virtual storage may be determined and a related process of the detected virtual machine may be interrupted at step S2040. For example, when control unit 160 detects one of the allocated virtual storages in the service unable state, control unit 160 may determine a virtual machine allocated with the detected virtual storage. Then, control unit 160 may temporarily interrupt virtual computing resources used in the determined virtual machine. In this case, control unit 160 may not return or release the virtual computing resources of the determined virtual machine. Such interruption may be freezing or pausing the related virtual computing resources of the determined virtual machine. For example, all processes related to the determined virtual machine may be interrupted, paused, or frozen. The present invention, however, is not limited thereto. Only processes related to the virtual storage allocated to the determined virtual machine may be interrupted, paused, or frozen. Accordingly, the file system of the virtual machine may be protected from damaging caused by errors generated during the related processes. Therefore, the file system of the virtual machine may maintain consistency after resuming the interrupted virtual computing resources.

At step S2050, the detected virtual storages may be monitored at a regular interval. For example, monitor unit 150 may continuously monitor the virtual storages in the service unable state and determine whether a state of the virtual storage is changed to a service ready state or not.

At step S060, determination may be made as to whether the state of the monitored virtual storage is changed or not. For example, control unit 160 may determine whether the state of the monitored virtual storage is changed or not based on the monitoring result.

When the state of the monitored virtual storage is not changed to the service ready state (No—S2060), the virtual storages in the service unable state may be continuously monitored at step S2050. For example, control unit 160 may request monitor unit 150 to continuously monitor the virtual storages in the service unable state.

When the state of the monitored virtual storage is changed to the service ready state (Yes—S2060), the interrupted virtual machine may be resumed at step S2070. For example, control unit 160 may resume the interrupted virtual computing resources of the related virtual machine. That is, the paused virtual machine may be resumed to access the virtual storage and to perform processes related to the virtual storage changing the state to the service ready state. Accordingly, the virtual machine may continuously perform the paused process without damaging the file system of the virtual machine and the consistency of the file system of the virtual machine may be safely protected from the generated errors.

As described above, the file system of the virtual machine may be protected from errors generated in a hypervisor level and/or a storage level in para virtualization based cloud computing system 100 in accordance with embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a plurality of virtual machines by a virtual machine control unit in a cloud computing system, the method comprising:
   monitoring a plurality of virtual storages allocated to the plurality of virtual machines;
   detecting a service unable virtual storage having a service unable state among the monitored plurality of virtual storages;
   choosing a virtual machine using the detected service unable virtual storage from the plurality of virtual machines; and
   temporarily interrupting the chosen virtual machine,
   wherein the monitoring includes:
      detecting errors generated at one of a hypervisor level connection and a storage level connection based on a result of the monitoring; and detecting, from the monitored virtual storages, a virtual storage associated to the detected errors and determining the detected virtual storage as the service unable virtual storage, and wherein:

the cloud computing system includes:

a storage configured to provide the plurality of virtual storages to the plurality of virtual machines, a hypervisor configured to allocate the virtual storages of the storage to the plurality of virtual machines and to control the allocated virtual storages in response to a request of the plurality of virtual machines, a storage interface providing an interface to the hypervisor to access the virtual storages allocated to the plurality of virtual machines, and the virtual machine control unit directly coupled between the hypervisor and the storage interface, the method comprises:

directly detecting, by the virtual machine control unit, errors generated in a network between the storage interface and the storage, wherein the network between the storage interface and the storage is exclusive of the storage interface and the storage, and a network between the storage interface and the hypervisor, wherein the network between the storage interface and the hypervisor is exclusive of the storage interface and the hypervisor.

2. The method of claim 1, wherein the interrupting includes:

determining, as a service unable virtual machine, a virtual machine associated with the detected service unable virtual storage among the plurality of virtual machines; and pausing virtual computing resources allocated to the determined service unable virtual machine without returning the virtual computing resources.

3. The method of claim 1, wherein the interrupting includes:

determining, as a service unable virtual machine, a virtual machine associated with the detected service unable virtual storage among the plurality of virtual machine; and pausing processes performed in the determined service unable virtual machine without returning virtual computing resources allocated to the determined service unable virtual machine, wherein the processes are related to accessing the virtual storages.

4. The method of claim 1, further comprising:

monitoring the detected service unable virtual storage;

determining whether the service unable state of the monitored service unable virtual storage is changed to a service ready state based on the monitoring result; and resuming the interrupted virtual machine associated with the monitored service unable virtual storage when the service unable state is changed to the service ready state.

5. The method of claim 1, further comprising:

continuously allowing virtual machines not associated with the service unable virtual storage to access to the plurality of virtual storages excluding the service unable virtual storage.

6. The method of claim 1, wherein the cloud computing system is virtualized based on a paravirtualization.

7. An apparatus configured to control a plurality of virtual machines in a cloud computing system including a storage configured to provide a plurality of virtual storages to the plurality of virtual machines, a hypervisor configured to control the storage and the plurality of virtual machines, and a storage interface configured to provide an interface to the hypervisor and the apparatus to access the plurality of virtual storages of the storage, the apparatus comprising:

a monitor circuit configured to monitor the plurality of virtual storages allocated to the plurality of virtual machines; and a control circuit configured to detect a service unable virtual storage having a service unable state among the monitored plurality of virtual storages, to determine a virtual machine using the detected service unable virtual storage from the plurality of virtual machines, and to temporarily interrupt the determined virtual machine associated with the detected service unable virtual storage, wherein the monitor circuit is configured to: detect errors generated at one of a hypervisor level connection and a storage level connection based on a result of the monitoring, detect, from the monitored plurality of virtual storages, a virtual storage associated to the detected errors, and determine the detected virtual storage as the service unable virtual storage, and wherein the monitor circuit is configured to detect errors generated in a network between the storage interface and the storage, wherein the network between the storage interface and the storage is exclusive of the storage interface and the storage, and a network between the storage interface and the hypervisor, wherein the network between the storage interface and the hypervisor is exclusive of the storage interface and the hypervisor.

8. The apparatus of claim 7, wherein the control circuit is configured to:

determine, as a service unable virtual machine, a virtual machine associated with the detected service unable virtual storage among the plurality of virtual machines; and pause virtual computing resources allocated to the determined service unable virtual machine without returning the virtual computing resources.

9. The apparatus of claim 7, wherein the control circuit is configured to:

determine, as a service unable virtual machine, a virtual machine associated with the detected service unable virtual storage among the plurality of virtual machines; and pause processes performed in the determined service unable virtual machine without returning the virtual computing resources, wherein the processes are related to accessing the virtual storage.

10. The apparatus of claim 7, wherein:

the monitor circuit is configured to monitor the detected service unable virtual storage; and the control circuit is configured to determine whether the service unable state of the monitored service unable virtual storage is changed to a service ready state based on the monitoring result and to resume the interrupted virtual machine associated with the monitored service unable virtual storage when the service unable state is changed to the service ready state.

11. The apparatus of claim 7, wherein the control circuit is configured to continuously allow virtual machines not associated with the service unable virtual storage to access the plurality of virtual storages excluding the service unable virtual storage.

12. The apparatus of claim 7, wherein the cloud computing system is virtualized based on a paravirtualization.

13. The apparatus of claim 7, wherein the apparatus is embodied as a module in the hypervisor.

14. The apparatus of claim 13, wherein the monitor circuit and the control circuit perform operations based on application programming interfaces (API) of the hypervisor.

15. A non-transitory machine-readable storage medium, having encoded thereon program code, wherein, where the program code is executed by a machine, the machine implements a method of controlling a plurality of virtual machines by a virtual machine control unit in a cloud computing system, comprising the steps of:
  monitoring a plurality of virtual storages allocated to the plurality of virtual machines;
  detecting a service unable virtual storage having a service unable state among the monitored plurality of virtual storages;
  choosing a virtual machine using the detected service unable virtual storage from the plurality of virtual machines; and
  temporarily interrupting the chosen virtual machine,
  wherein the monitoring includes:
    detecting errors generated at one of a hypervisor level connection and a storage level connection based on a result of the monitoring; and
    detecting, from the monitored virtual storages, a virtual storage associated to the detected errors and determining the detected virtual storage as the service unable virtual storage, and wherein:
  the cloud computing system includes:
    a storage configured to provide the plurality of virtual storages to the plurality of virtual machines,
    a hypervisor configured to allocate the virtual storages of the storage to the plurality of virtual machines and to control the allocated virtual storages in response to a request of the plurality of virtual machines,
    a storage interface providing an interface to the hypervisor to access the virtual storages allocated to the plurality of virtual machines, and
  the virtual machine control unit coupled between the storage interface and the hypervisor, and the method comprises:
    detecting errors generated in a network between the storage interface and the storage, wherein the network between the storage interface and the storage is exclusive of the storage interface and the storage, and a network between the storage interface and the hypervisor, wherein the network between the storage interface and the hypervisor is exclusive of the storage interface and the hypervisor.

16. The non-transitory machine-readable storage medium of claim 15, further comprising; the steps of:
  monitoring the detected service unable virtual storage;
  determining whether the service unable state of the monitored service unable virtual storage is changed to a service ready state based on the monitoring result; and
  resuming the interrupted virtual machine associated with the monitored service unable virtual storage when the service unable state is changed to the service ready state.

* * * * *